United States Patent
Heil et al.

(10) Patent No.: US 7,878,011 B2
(45) Date of Patent: Feb. 1, 2011

(54) METHOD FOR DETERMINING THE DESIRED VENTILATION AIR TEMPERATURE OF AN AUTOMATIC AIR-CONDITIONING SYSTEM IN A CONVERTIBLE

(75) Inventors: Michael Heil, Forstinning (DE); Robert Salzberger, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 703 days.

(21) Appl. No.: 11/878,151

(22) Filed: Jul. 20, 2007

(65) Prior Publication Data

US 2008/0020697 A1 Jan. 24, 2008

Related U.S. Application Data

(63) Continuation of application No. PCT/EP2005/012932, filed on Dec. 2, 2005.

(30) Foreign Application Priority Data

Jan. 22, 2005 (DE) ........................ 10 2005 003 086

(51) Int. Cl.
    *B60H 1/32* (2006.01)
(52) U.S. Cl. ........................... 62/133; 62/244; 165/271; 454/75; 454/129
(58) Field of Classification Search .................. 62/133, 62/244; 454/75, 129, 136; 165/271
    See application file for complete search history.

(56) References Cited

U.S. PATENT DOCUMENTS

| 5,003,785 | A | 4/1991 | Petri et al. |
| 6,054,821 | A | 4/2000 | Koch et al. |
| 6,772,834 | B2 | 8/2004 | Iwamoto et al. |
| 7,075,034 | B2 | 7/2006 | Bargheer et al. |
| 2001/0045278 | A1 | 11/2001 | Iwamoto et al. |
| 2008/0113600 | A1* | 5/2008 | Kim ........................... 454/105 |
| 2008/0220710 | A1* | 9/2008 | Nonnenmacher et al. ..... 454/75 |

(Continued)

FOREIGN PATENT DOCUMENTS

DE   38 43 898 A1   6/1990

(Continued)

OTHER PUBLICATIONS

International Search Report dated Feb. 2, 2006 with English translation (Four (4) pages).

(Continued)

*Primary Examiner*—Marc E Norman
(74) *Attorney, Agent, or Firm*—Crowell & Moring LLP

(57) ABSTRACT

A method for determining the desired ventilation air temperature of an automatic heating and air-conditioning system of a vehicle having an opening top is described. The open or closed state of the top of the vehicle is detected, and the heating and air-conditioning system is controlled and/or regulated in a number of different ways as a function of the state of the top. In the open state of the top, the desired ventilation air temperature is determined as a function of the speed of the vehicle. Also, in the open state of the top the desired ventilation air temperature is determined in such a manner that the top-closed desired ventilation air temperature is increased by a speed-dependent offset value.

20 Claims, 3 Drawing Sheets

U.S. PATENT DOCUMENTS

2008/0302878 A1* 12/2008 Helms ...................... 236/49.3

FOREIGN PATENT DOCUMENTS

| DE | 197 47 326 | A1 | 5/1999 |
|---|---|---|---|
| DE | 102 26 008 | A1 | 1/2004 |
| DE | 102 35 580 | A1 | 2/2004 |
| JP | 63-41226 | A | 2/1988 |

OTHER PUBLICATIONS

German Search Report dated Sep. 12, 2005 with English translation (Eight (8) Pages).

* cited by examiner

METHOD FOR DETERMINING THE DESIRED VENTILATION AIR TEMPERATURE OF AN AUTOMATIC AIR-CONDITIONING SYSTEM IN A CONVERTIBLE

CROSS REFERENCE TO RELATED APPLICATIONS

This application is a continuation of PCT/EP2005/012932, filed Dec. 2, 2005, which claims priority under 35 U.S.C. §119 to German Patent Application No. 102005003086.6, filed Jan. 22, 2005, the entire disclosures of which are herein expressly incorporated by reference.

BACKGROUND AND SUMMARY OF THE INVENTION

The invention relates to a method for determining the desired ventilation air temperature of an automatic heating and air-conditioning system of a vehicle, preferably a convertible, wherein the open or closed state of the vehicle's top is detected.

Currently many vehicles are equipped with a heating and air-conditioning system, which enables the occupants to heat or air-condition, as desired, the interior of the vehicle while the vehicle is closed. If the heating and air-conditioning system is an automatically controlled heating and air-conditioning system, all manipulations of the heating and air-conditioning system are performed automatically as a function of the adjustments made by the vehicle occupants. In openable vehicles—for example, convertibles—the automatic control and/or regulation is usually carried out the same way when the top is open as when the top is closed. The result is that the vehicle occupants switch off the automatic heating and air-conditioning system, since it does not automatically react to the new requirements of the vehicle occupants.

German Patent Document DE 197 47 326 A1 discloses an automatic air-conditioning system, which automatically switches off when the folding top is open. The vehicle occupants could, in fact, perform the adjustment manually, but that would require a great deal of effort to operate due to the continuously changing boundary conditions, such as the incoming sunlight intensity.

German Patent Document DE 38 43 898 C2 describes a method for controlling a heating system for vehicles that have tops that can be opened and closed. When the top is closed, an interior temperature control mode for setting the temperature mixing flaps as a function of the interior temperature, the desired temperature and the ventilation air temperature is enabled. When the top is open, a switch is made to a ventilation air temperature control mode, in which the temperature mixing flap is adjusted only as a function of the desired temperature and the ventilation air temperature. Therefore, the interior temperature sensor no longer has any effect on the control unit.

Furthermore, US Patent Document 2001/0045278 A1 discloses an automatic air-conditioning system for a vehicle, in which, when the top is open, the blower output is increased by a speed-dependent offset value. In a special design of the air-conditioning system, the top-open blower output is increased by the speed-dependent offset value, only if the outside temperature is within a predefined outside temperature range.

The present invention provides methods to improve—in terms of the requirements of the vehicle occupants—the control and/or regulation of a heating and air-conditioning system for vehicles that have a top that can be opened and closed.

An exemplary inventive method for determining the desired ventilation air temperature of an automatic heating and air-conditioning system of a vehicle, preferably a convertible is explained. In the method, an open or closed state of the top of the vehicle is detected, and the heating and air-conditioning system is controlled and/or regulated in a number of different ways as a function of the state of the top. The exemplary method includes determining the open state of the top, and setting the desired ventilation air temperature at the ventilation flaps as a function of the speed of the vehicle. The vehicle opening, which is called here the top, can include, for example, the top of a convertible, a panorama glass roof, a sun-roof, a moon-roof or a folding top.

The desired ventilation air temperature of the exemplary automatic heating and air-conditioning system is defined preferably as the desired ventilation air temperature at the ventilation flaps of the heating and air-conditioning system. The ventilation flaps, which are a part of an air distribution unit in the vehicle, may be disposed above the leg room flaps and are used for optimizing the temperature control of the vehicle occupants in the upper areas of the body. Owing to the modified surrounding situation, a vehicle occupant, who is sitting in a vehicle the top of which is open, perceives, as compared to sitting in a closed vehicle, other and/or more influencing variables, such as the wind caused when the vehicle is moving. For this reason the state of the top of the vehicle is detected, and the temperature is automatically controlled and/or regulated as a function of the state of the top in a number of different ways, so that the vehicle occupant obtains a temperature control of the interior of the vehicle that is adjusted to the new surrounding situation, and is comfortable for him.

Since the top-open vehicle speed is a significant factor with respect to the temperature perception of the vehicle occupant, the embodiments of the invention provide that the top-open desired ventilation air temperature may be specified and/or controlled in various ways as a function of the speed of the vehicle.

In the open state of the top, the desired ventilation air temperature is determined in such an advantageous exemplary manner that the top-closed desired ventilation air temperature, in particular the desired ventilation air temperature at the ventilation flaps, is increased by a speed-dependent offset value. Therefore, the energy losses, which result from the top being open and which increase as the speed of the vehicle increases, are compensated for by increasing the desired ventilation air temperature. Instead of superimposing the offset value, the top-open desired ventilation air temperature can also be determined, for example, by a characteristic curve or a computational routine that is filed or stored in a control unit.

In one embodiment, since the energy losses at low speeds are relatively small, it is advantageous for the speed-dependent offset value to be approximately zero when the top is open and the speed falls below a predefined first speed threshold value. Thus, when the offset value is set to zero, the desired ventilation air temperature with the top open and at low speeds of the vehicle is equivalent to the desired ventilation air temperature when the top is closed.

In the open state of the top and at a speed ranging from a predefined first speed threshold value to a predefined second speed threshold value, the predefined first speed threshold value being less than the predefined second speed threshold value, it is advantageous to increase, according to a ramp having a constant slope, the speed-dependent offset value, from zero to a maximum offset threshold value, according to an embodiment of the invention.

Since at very high speeds the energy losses stay approximately constant, with the top open and at a speed that exceeds a predefined second speed threshold value, it is advantageous for the exemplary speed-dependent offset value to assume a predefined constant offset threshold value.

In addition, when the top is open, a different desired ventilation air temperature can be specified as a function of the outside temperature. The desired ventilation air temperature can be determined, for example, such that when the top is open, the top-closed desired ventilation air temperature is increased by a speed-dependent and outside temperature-dependent offset value. The speed-dependent and outside temperature-dependent offset value may be the product, for example, of a speed-dependent offset value and an outside temperature factor.

Thus at very high outside temperatures, setting the outside temperature factor to zero does not load the desired ventilation air temperature with a speed-dependent offset value, since at these temperature ranges the desired ventilation air temperature is usually already defined adequately high. Instead of setting the outside temperature factor to zero, this factor can also assume a negative value. Therefore, according to this embodiment, when the top is open in this condition the desired ventilation air temperature becomes smaller than when the top is closed.

At an outside temperature that ranges from a predefined first outside temperature threshold value to a predefined second outside temperature threshold value, the first outside temperature threshold value being less than the second outside temperature threshold value, the speed-dependent offset value may be advantageously multiplied by an outside temperature factor, which becomes larger, according to a ramp, from the first predefined outside temperature threshold value up to the second predefined outside temperature threshold value.

The outside temperature factor may preferably have a value between zero and one. Thus, the top-open desired ventilation air temperature may be increased by a speed-dependent and outside temperature-dependent offset value, which can assume a value of zero up to a value that is equivalent to the speed-dependent offset value without considering the outside temperature.

The position of the window panes and/or a wind deflector of the vehicle can also be detected, for example with sensors, according to another embodiment of the invention. In addition, the desired ventilation air temperature can be controlled as a function of the position of the window panes and/or the wind deflector. As stated above, when the top is open a vehicle passenger reacts to the surrounding situation (temperature, incoming sunlight, wind conditions, blower) much more intensively than in a closed vehicle and/or a convertible with the top closed. The position of the window panes and/or the wind deflector can also be a factor in the occupant's perception of comfort owing to the air currents generated. Therefore, it is advantageous in one embodiment to detect the position of the window panes and/or the wind deflector, and to adjust accordingly the control unit of the heating and air-conditioning system primarily with respect to the control and/or regulation for specifying the desired ventilation air temperature, in particular the desired ventilation air temperature at the ventilation flaps.

Other objects, advantages and novel features of the present invention will become apparent from the following detailed description of the invention when considered in conjunction with the accompanying drawings.

BRIEF DESCRIPTION OF THE DRAWINGS

Other particulars of the invention are disclosed in the following detailed descriptions and the accompanying drawings.

DETAILED DESCRIPTION OF THE DRAWINGS

Figure 1:
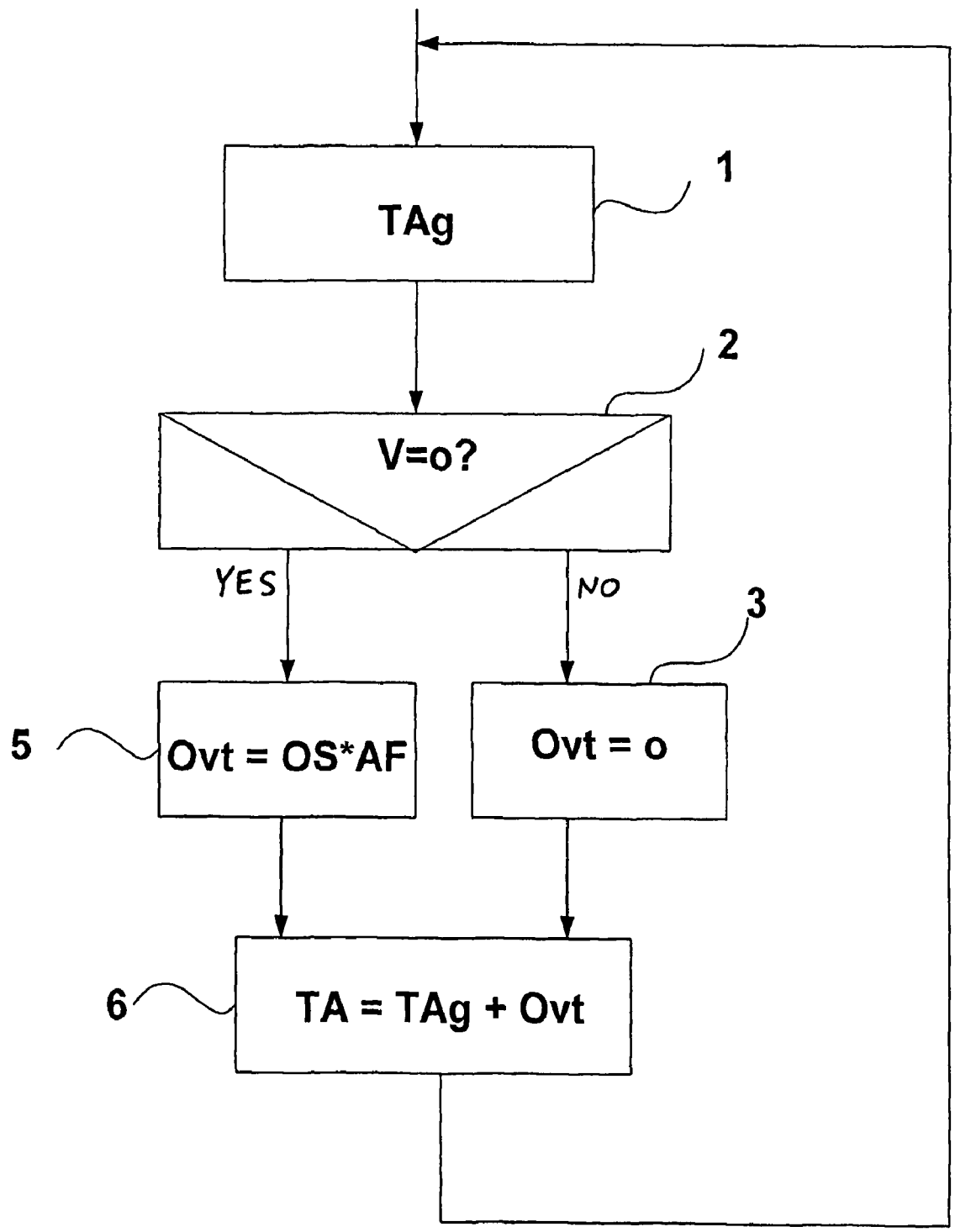
FIG. 1 depicts an exemplary simplified flow diagram for calculating a desired ventilation air temperature.

FIG. 1 depicts a simplified flow chart for calculating the desired ventilation air temperature TA of an automatic heating and air-conditioning system of a vehicle with a top that can be opened. In an especially preferred exemplary embodiment, the desired ventilation air temperature that is to be calculated here can be the desired ventilation air temperature at the ventilation flaps of the automatic heating and air-conditioning system. In a first step 1 the desired ventilation air temperature TAg for a closed top, which has closed the top of the vehicle, is determined. The desired ventilation air temperature TAg for a closed top is determined, according to a conventional method, as a function of the various measured variables and operating parameters. For example, the variables may include the inside temperature of the vehicle and the desired temperature specified by the driver.

In a second step 2 the position of the top is determined, for example, by the query V=o?. The position of the top can be determined, for example, by using a limit position switch or by evaluating the various other measured variables and/or operating parameters.

Figure 2:
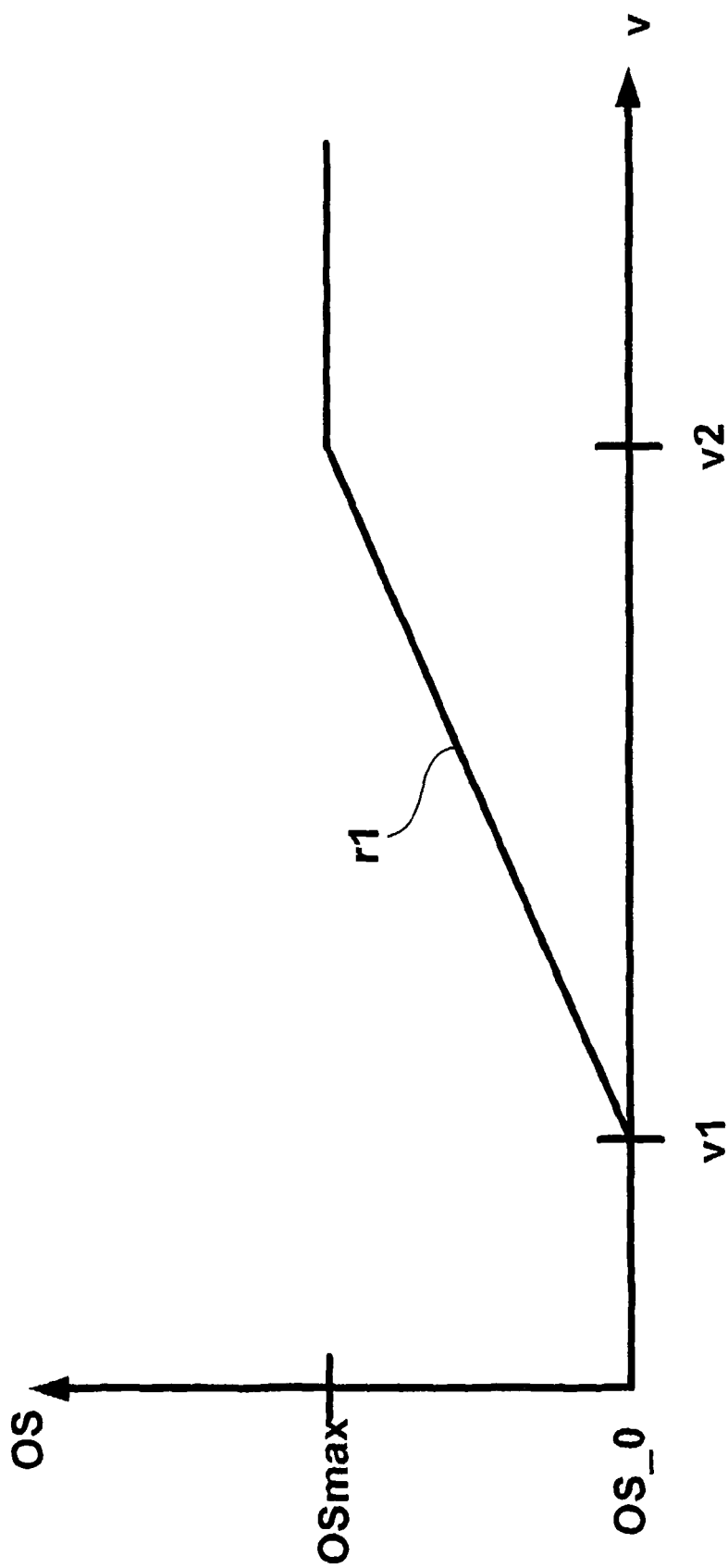
FIG. 2 depicts an exemplary characteristic curve for determining a speed-dependent offset value.
Figure 3:
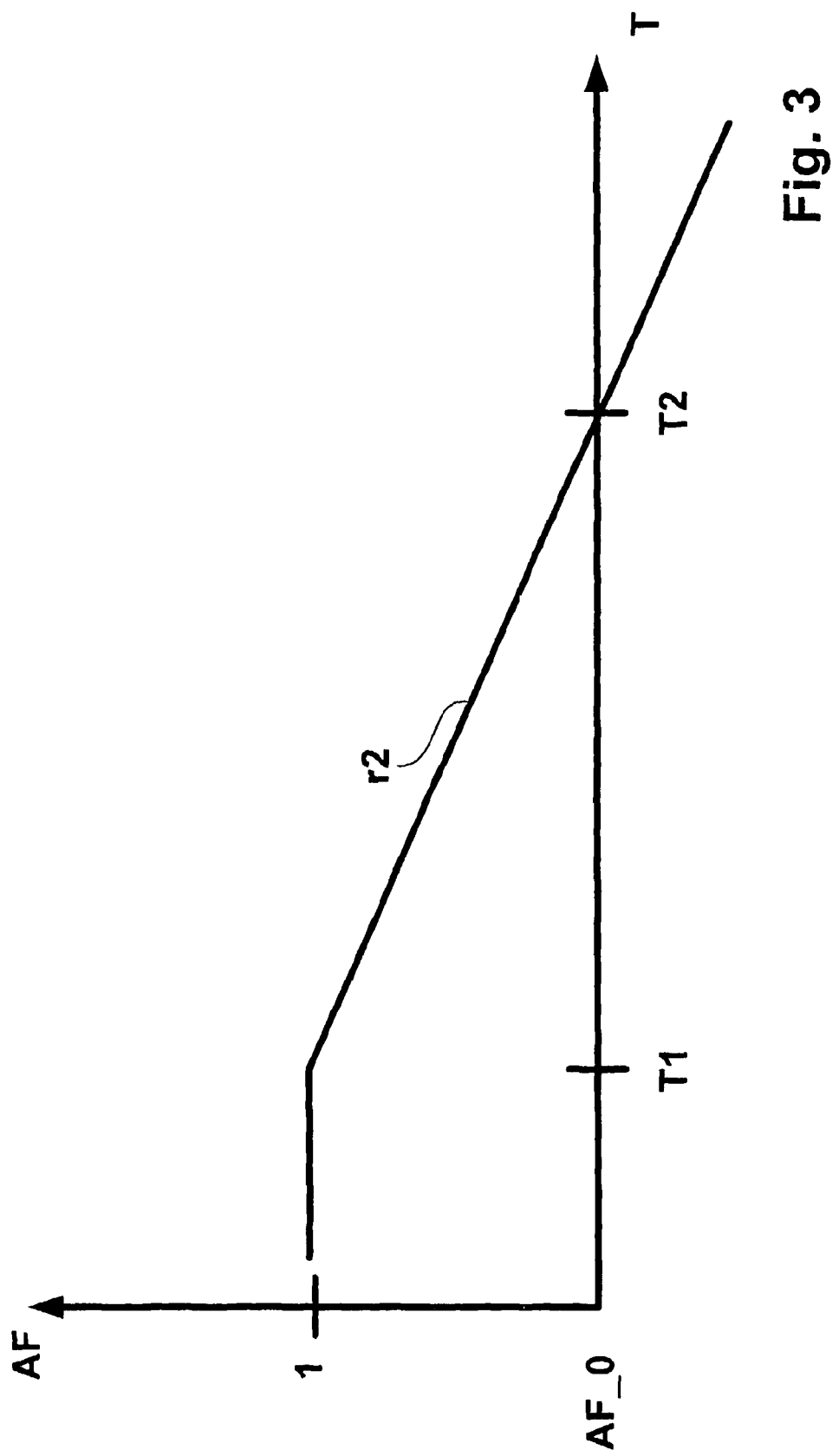
FIG. 3 depicts an exemplary characteristic curve for determining an outside temperature factor.

If the top of the vehicle is open, so that (V=o)=yes, in an exemplary step 5 a speed-dependent and outside temperature-dependent offset value Ovt is determined, for example, by multiplying the speed-dependent offset value OS by an outside temperature factor AF. The speed-dependent offset value OS and the outside temperature factor AF can be determined, for example, from a characteristic curve or a group of curves filed in the control unit of the heating and air-conditioning system. Preferred exemplary characteristic curves for determining the speed-dependent offset value OS and/or the outside temperature factor AF are shown in FIGS. 2 and 3. In a next step 6, the desired ventilation air temperature TA is determined, for example, by adding the top-closed desired ventilation air temperature TAg, which had already been found in step 1, to the speed-dependent and outside temperature-dependent offset value Ovt. After step 6, the system returns to step 1, and the process for determining the desired ventilation air temperature TA begins all over again.

If the top is closed, so that (V=o)=no, from step 2 the system moves to a next step 3 in which a speed-dependent and outside temperature-dependent offset value Ovt, which may have been determined before, is set to zero. In the next exemplary step 6 the desired ventilation air temperature TA is determined by adding the top-closed desired ventilation air temperature TAg, which had been determined before in step 1, to the speed-dependent and outside temperature-dependent offset value Ovt. Since the speed-dependent and outside temperature-dependent offset value Ovt was set to zero, the top-open desired ventilation air temperature TA is equivalent to the top-closed desired ventilation temperature TAg.

FIG. 2 depicts an exemplary characteristic curve for determining the speed-dependent offset value OS as a function of the vehicle speed v. As long as the speed v of the vehicle falls below a predefined first speed threshold value v1, which may be advantageously selected to be about 100 km/h, the speed-dependent offset value OS has a value of zero or in this case OS_0. If the speed v of the vehicle is greater than the predefined first speed threshold value v1 and less than a predefined second speed threshold value v2, which may be advantageously selected to be about 180 km/h, and is thus greater than the first speed threshold value v1, the speed-dependent offset value OS rises steadily. For example, it may increase according to a ramp r1, for example with a constant slope, starting from zero (OS_0). At the predefined second speed threshold value v2, the speed-dependent offset value OS has reached a maximum offset threshold value OSmax. If at this stage the speed v of the vehicle continues to increase above the predefined second speed threshold value v2, the speed-dependent offset value OS continues to retain the maximum offset threshold value OSmax.

If the speed v of the vehicle decreases again, the speed-dependent offset value OS may decrease, according to the exemplary characteristic curve in FIG. 2, following a certain delay. The delay may be advantageously selected to be about 2 seconds. The delay in the adjustment of the speed-dependent offset value can be implemented, for example, with a low pass filter in the control unit.

FIG. 3 depicts an exemplary characteristic curve for determining the outside temperature factor AF as a function of the outside temperature T. As long as the outside temperature T falls below a predefined first outside temperature threshold value T1, which may be advantageously selected to be about 15 deg. C., the outside temperature factor AF has a value of 1. The result is a desired ventilation air temperature TA, which is equivalent to the sum of the desired ventilation air temperature TAg with the top closed and at the speed-dependent offset value OS. If the outside temperature T is greater than the predefined first outside temperature threshold value T1 and less than a predefined second outside temperature threshold value T2, which may be advantageously selected to be about 25 deg. C. and is, thus, greater than the first outside temperature threshold value T1, the outside temperature factor AF decreases steadily, according to a ramp r2, for example with a constant slope, from a value of 1 to zero, or in this case AF_0.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for setting a desired ventilation air temperature of a vehicle automatic heating and air-conditioning system, comprising the acts of:
   detecting an open or closed state of a top of the vehicle; and
   automatically controlling the heating and air-conditioning system, in the open state of the top, by determining the desired ventilation air temperature as a function of a speed of the vehicle.

2. Method as claimed in patent claim 1, wherein, in the open state of the top, the desired ventilation air temperature is determined by increasing a top-closed desired ventilation air temperature by a speed-dependent offset value.

3. Method as claimed in patent claim 2, wherein, in the open state of the top and at a vehicle speed below a predefined first speed threshold value, the speed-dependent offset value is substantially set to zero.

4. Method as claimed in patent claim 3, wherein, in the open state of the top and at a vehicle speed from the predefined first speed threshold value to a predefined second speed threshold value greater than the predefined first speed threshold value, the speed-dependent offset value is increased from zero to a maximum offset threshold value.

5. Method as claimed in patent claim 4, wherein, in the open state of the top and at a vehicle speed exceeding the predefined second speed threshold value, the speed-dependent offset value is set to be substantially constant at a predefined offset threshold value.

6. Method as claimed in patent claim 5, wherein the predefined offset threshold value is set to substantially equal the maximum offset threshold value.

7. Method as claimed in claim 1, wherein, in the open state of the top, the desired ventilation air temperature is further determined as a function of an outside temperature.

8. Method as claimed in patent claim 7, wherein, in the open state of the top, the desired ventilation air temperature is determined by increasing a top-closed desired ventilation air temperature by a speed-dependent and outside temperature-dependent offset value.

9. Method as claimed in patent claim 8, wherein the speed-dependent and outside temperature-dependent offset value is set to equal a product of a speed-dependent offset value and an outside temperature factor.

10. Method as claimed in patent claim 9, wherein, in the open state of the top and at an outside temperature lower than a predefined first outside temperature threshold value, the outside temperature factor is set to equal one.

11. Method as claimed in patent claim 10, wherein, at all outside temperatures higher than a predefined second outside temperature threshold value, the outside temperature factor is set to equal one of zero and a negative value.

12. Method as claimed in patent claim 11, wherein, at an outside temperature ranging from the predefined first outside temperature threshold value to the predefined second outside temperature threshold value higher than the first outside temperature threshold value, the outside temperature factor is decreased from a first value equal to 1 to a second value equal to zero and remains decreased at all outside temperatures higher than the second outside temperature threshold value.

13. The method as claimed in patent claim 1, further comprising detecting an open or closed state of one of a folding top, convertible top, sun-roof and moon-roof.

14. A system for controlling an automatic heating and air conditioning system of a vehicle, comprising:
    a sensor for determining an open and closed state of a top of the vehicle; and
    a control element for setting a ventilation air temperature of the heating and air conditioning system; wherein
    when the top is determined open, the ventilation air temperature is set as a function of a vehicle speed.

15. The system according to claim 14, wherein the ventilation air temperature corresponds to a closed-top temperature plus a speed-dependant offset value.

16. The system according to claim 15, wherein the speed dependant offset value has a first value for a vehicle speed below a first speed threshold value, a second value above a second speed threshold value higher than the first speed threshold value, and a substantially linear value variation therebetween.

17. The system according to claim 14, wherein the ventilation air temperature is further set as a function of an outside temperature when the top is open.

18. The system according to claim 17, wherein the ventilation air temperature corresponds to a closed-top temperature plus a speed-dependant and outside temperature-dependant offset value derived in part from an outside temperature factor.

19. The system according to claim 18, wherein the outside temperature factor has a first value for an outside temperature below a first temperature threshold value, a second value above a second temperature threshold value greater than the first temperature threshold value, and a substantially linear value variation therebetween.

20. The system according to claim 18, wherein the speed-dependant and outside temperature-dependant offset value comprises a product of a speed-dependant offset value and the outside temperature factor.

* * * * *